United States Patent [19]

Penneck

[11] 3,950,604
[45] Apr. 13, 1976

[54] HEAT-SHRINKABLE ARTICLES HAVING NON-LINEAR ELECTRICAL RESISTANCE CHARACTERISTICS

[75] Inventor: Richard J. Penneck, Lechlade, England

[73] Assignee: Raychem Limited, Swindon, England

[22] Filed: Aug. 31, 1973

[21] Appl. No.: 393,509

[30] Foreign Application Priority Data
Sept. 1, 1972   United Kingdom............... 40752/72

[52] U.S. Cl................. 174/68 A; 138/137; 156/86; 174/73 R; 174/DIG. 8; 252/516; 338/314; 428/36; 428/331; 428/451; 428/519; 428/913
[51] Int. Cl.².... H01B 1/04; B32B 1/08; B32B 5/16; B32B 7/02
[58] Field of Search............ 174/1, 35 MS, 36, 68 R, 174/68 A, 73 R, 73 SC, 78, 102 SC, 105 SC, 106 SC:120 SC, 127, DIG. 8, 135; 138/137, 141, 145, 146; 156/84, 85, 86; 161/402, 411, 412, 162, 166, 206, 208, 410; 252/504, 516; 264/230; 117/7, 160 A, 216; 338/258, 210, 211, 214, 306, 314

[56] References Cited
UNITED STATES PATENTS

| | | | |
|---|---|---|---|
| 3,210,460 | 10/1965 | Suelmann | 174/73 R |
| 3,210,461 | 10/1965 | Berg et al. | 174/127 |
| 3,412,200 | 11/1968 | Virsberg et al. | 174/102 SC |
| 3,576,387 | 4/1971 | Derby | 174/102 SC X |

FOREIGN PATENTS OR APPLICATIONS 1,177,394   1/1970   United Kingdom............... 174/73 R

*Primary Examiner*—Laramie E. Askin
*Attorney, Agent, or Firm*—Lyon & Lyon

[57] ABSTRACT

A polymer composition containing silicon carbide of a critical maximum average particle size can be processed into heat-shrinkable articles possessing nonlinear electrical resistance characteristics. An embodiment of the invention provides a heat-shrinkable article comprising a laminate of a layer of elastomer, including silicon carbide particles, and a layer of a heat-shrinkable polymeric material. The elastomeric layer may be a blend of a rubbery polymer and a low density polyethylene having dispersed therein particulate silicon carbide of particle size finer than about 300 grit.

15 Claims, 9 Drawing Figures

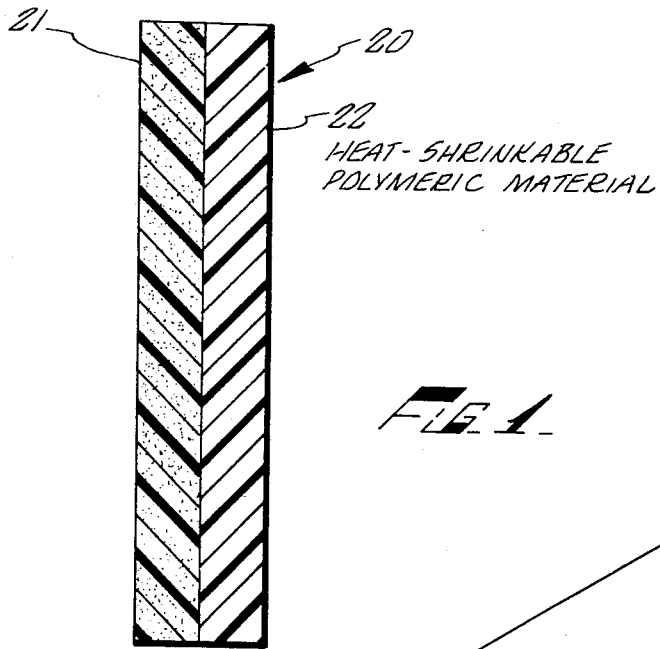
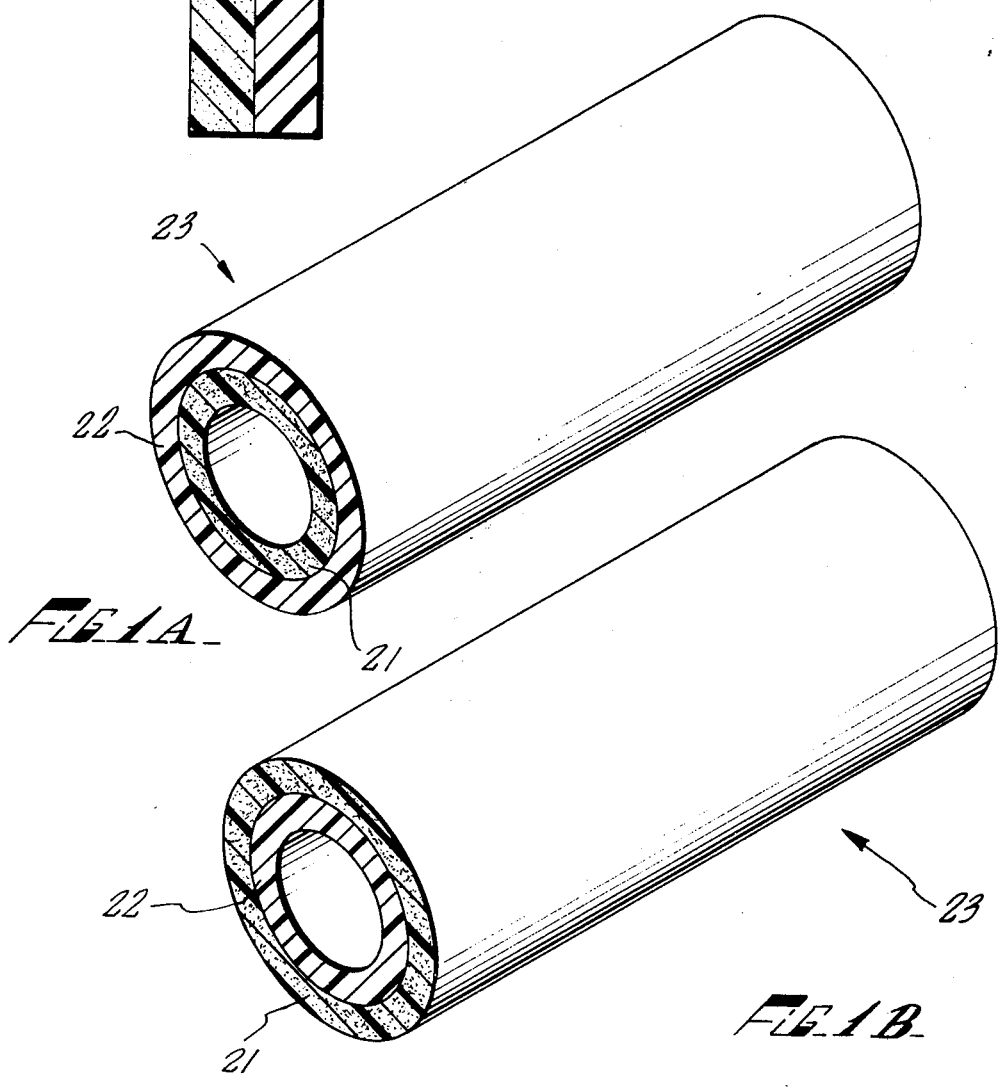

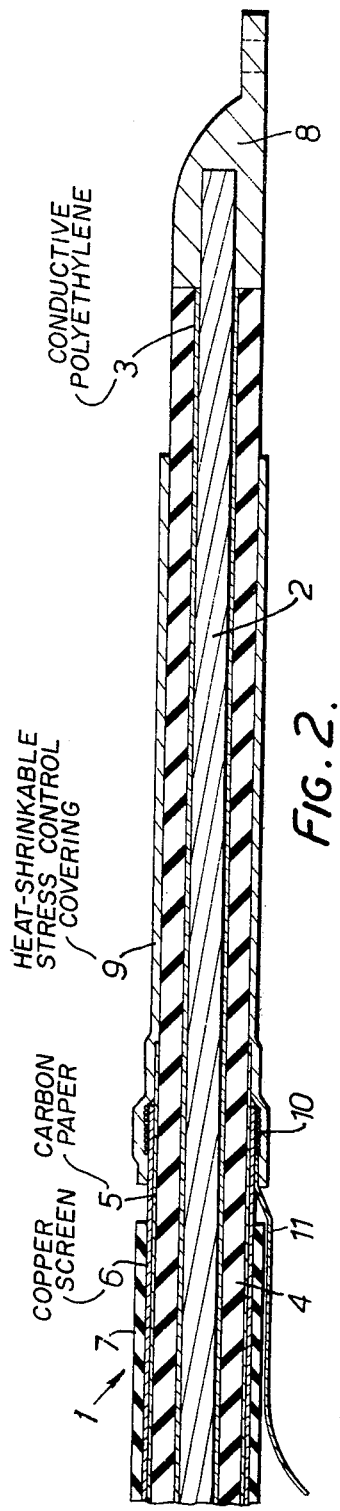
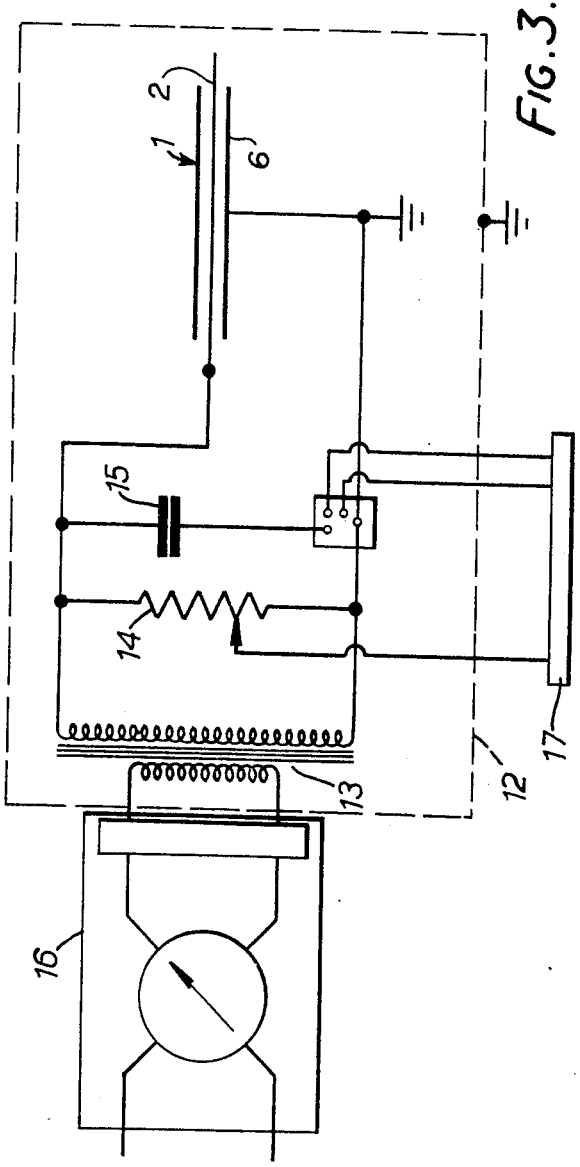
FIG. 2.
FIG. 3.

HEAT-SHRINKABLE ARTICLES HAVING NON-LINEAR ELECTRICAL RESISTANCE CHARACTERISTICS

BACKGROUND OF THE INVENTION

This invention relates to materials having nonlinear electrical resistance characteristics.

In the past, in order to suppress the occurrence of electrical discharges on surfaces of high-voltage cable insulation, for example at high-voltage cable terminations, the insulation was provided with a stress control covering of a material having nonlinear electrical resistance characteristics. Prior art coverings were typically in the form of preformed sleeves, wrapped tapes or dried coatings of such materials. These coverings have the disadvantage that, in general, an effective stress control covering can be obtained only by careful and skillful application of the covering, that the materials have undesirable properties, for example rapid aging, at elevated temperatures, or that the elongation properties of the materials are inadequate which may result in the covering cracking if the cable expands, as it will do if heat cycling occurs, or is bent or twisted.

It has been proposed to form a stress control covering on cable insulation by heat-shrinking a heat-shrinkable tube of a material loaded with silicon carbide onto the insulation. Such tubes would have the advantage that they could be easily installed, that no skill would be required in maintaining correct tension of the covering and that a predetermined thickness of covering could be guaranteed. To achieve the necessary nonlinearity of resistance, the volume loading of silicon carbide in the material needs to be in the region of 40%. At such loadings, heretofore known materials capable of being rendered heat-shrinkable have extremely poor physical properties, such as insufficient elongation at break and poor tear strength. Thus they break or tear when attempts are made to process them into heat-shrinkable articles.

SUMMARY OF THE INVENTION

It is therefore an object of this invention to provide a composition of matter having nonlinear electrical resistance.

It is another object of this invention to provide a heat-shrinkable article having nonlinear electrical resistance.

BRIEF DESCRIPTION OF THE DRAWINGS

The invention both as to its organization and principles of operation, together with further objects and advantages thereof, may better be understood by referring to the following detailed description of embodiments of the invention when taken in conjunction with the accompanying drawings in which:

FIG. 1 illustrates, in cross-section, a heat-shrinkable laminate according to the invention.

FIG. 1A illustrates, in partial cross-sectional end view, a heat-shrinkable tube according to the invention.

FIG. 1B illustrates, in partial cross-sectional end view, another heat-shrinkable tube according to the invention.

FIG. 2 illustrates a sectional side elevation of one end of a cable which has been prepared for termination in accordance with this invention.

FIG. 3 illustrates circuitary and apparatus for determining discharge magnitude in accordance with this invention.

DESCRIPTION OF A PREFERRED EMBODIMENT

Figure 4:
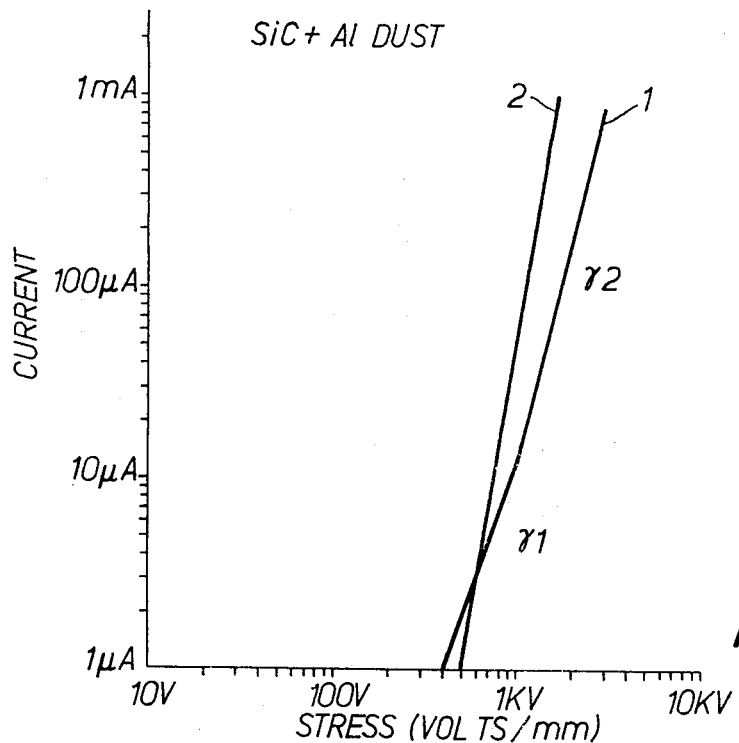
FIGS. 4, 5, 6 and 7 illustrate current voltage stress plots in accordance with this invention.

The present invention is based on the observation that certain polymer combinations containing silicon carbide of a critical maximum average particle size possess nonlinear electrical resistance characteristics and can be processed into heat-shrinkable articles.

According to the invention, there is provided a material which can be processed into heat-shrinkable articles, which material comprises a blend of a. an ethylene-propylene rubber copolymer or an ethylene-non-conjugated diene rubber terpolymer, wherein the ethylene content is at least 65%, preferably at least 70%; or a butadiene/acrylonitrile rubber containing 10% to 40% by weight acrylonitrile, b. a copolymer of ethylene and a copolymerisable monomer preferably selected from the group consisting of methyl, ethyl and other lower alkyl-acrylates and -methacrylates, vinyl acetate and lower alkyl esters of maleic, fumaric and itaconic acids, this component being optional when component (a) is a butadiene/acrylonitrile rubber, and c. a low density polyethylene, which blend has dispersed therein silicon carbide and, optionally, one or more conducting particulate fillers, the particle size of the silicon carbide being finer than 400 grit size, preferably finer than 500 grit size.

The blend preferably comprises, per 100 parts by weight of component (a), from 20 to 75, preferably from 25 to 50, parts by weight of component (b) and from 15 to 70, preferably from 20 to 50, parts by weight of component (c).

As component (a), there is preferably used an ethylene-propylene-non-conjugated diene terpolymer having a high molecular weight, for example one having a high Mooney viscosity, which may contain up to 40 percent by weight of a naphthenic oil as a processing aid. There is especially used one of those terpolymers listed in Tables 1 to 3 hereunder, which Tables give details of chemical compositions, Mooney viscosities and the nature and quantity of processing oil, if any, used. The code numbers are those allotted by the suppliers.

TABLE 1

| Royalene (Manufactured) by Uniroyal) | 301T | 400 | 512 | 521 | 611 | Royalene | 1812 | 1750 |
|---|---|---|---|---|---|---|---|---|
| Ethylene Content % | 65 | 65 | 68 | 68 | 70 | Ethylene Content % | 77.0 | 77.0 |
| Mooney Viscosity (250°F) ML1+4 | 34–46 | 32–45 | 55–70 | 40–50 | 35–45 | Mooney Viscosity (250°F) ML1+4 | 35–45 | 35–45 |
| Nature of Termonomer | D.C.P. | D.C.P. | E.N.B. | E.N.B. | E.N.B. | Nature of Termonomer | E.N.B. | E.N.B. |

TABLE 1-continued

| Royalene (Manufactured by Uniroyal) | 301T | 400 | 512 | 521 | 611 | Royalene | 1812 | 1750 |
|---|---|---|---|---|---|---|---|---|
| Quantity of Termonomer | 2.5–3.5% | 2.5–3.5% | 2.5–3.5% | 2.5–3.5% | 2.5–3.5% | Quantity of Termonomer | 2.5–3.5% | 2.5–3.5 |
| Nature of Processing Oil | 0 | Naphthenic | 0 | 0 | Paraffinic | Nature of Processing Oil | 0 | 0 |
| Quantity of Processing Oil | 0 | 100% | 0 | 0 | 40% | Quantity of Processing Oil | 0 | 0 |

1812 is identical to 611 but without the processing oil.
1750 is an experimental grade of 611.

TABLE 2

| Nordel (Manufactured by Du Pont) | 1145 | 1560 | 1500 |
|---|---|---|---|
| Ethylene Content | 65% | 72% | 72% |
| Mooney Viscosity (250°F) | 45 | Too high to measure | Too high to measure |
| Nature of Termonomer | 1,4-hexadiene | 1,4-hexadiene | 1,4-hexadiene |
| Quantity of Termonomer | 2.6% | 3.0% | 3.0% |
| Nature of Processing Oil | 0 | 0 | 0 |
| Quantity of Processing Oil | 0 | 0 | 0 |

Nordel 1560 is a non-milling grade.
Nordel 1500 is identical to 1560 but supplied as grains.

TABLE 3

| Montecatini | 535D | 038DMX |
|---|---|---|
| Ethylene Content | 69% | 67–70% |
| Mooney Viscosity 212°F | 50–60 | 75–85 |
| Nature of Termonomer | D.C.P. | E.N.B |
| Quantity of Termonomer | 4% | 3.5% |
| Nature of Processing Oil | Naphthenic non staining | 0 |
| Quantity of Processing Oil | 50% | 0 |

In the above Tables, D.C.P. stands for dicyclopentadiene and E.N.B. stands for ethylidene norbornene.

It has also been found that various grades of Keltans (manufactured by Dutch State Mines) and Intolans (manufactured by International Synthetic Rubber Co.) are suitable ethylene-propylene rubbers, provided the ethylene proportion is sufficiently high. Details of the probable chemical composition of many ethylene-propylene rubbers are given in an article entitled "Polyolefin Elastomers Based on Ethylene and Propylene" by F. P. Baldwin and G. Ver Strate, in Rubber Chemistry and Technology, Volume 45, No. 3, Apr. 30, 1972, Pages 709 to 881.

It has also been found that nitrile rubbers may be especially mentioned, for example, Breon 1041.

As component (b), there is preferably used an ethylene-ethyl acrylate copolymer containing about 18% by weight of ethyl acrylate.

Suitable silicon carbides are, for example, those manufactured by the Carborundum Company and known as F500, F600, 800, 1000, 1200, 1500 and especially F1200/S, and those manufactured by A/S Arendal Smetherverk, Eydehaven, Norway and known as F500/13, F600/9, F800/7, F1,000/5 and F1200/3. These silicon carbides have an average particle size of less than 15 microns, all of the particles having a particle size of less than 45 microns. In general, the smaller the average particle size of the silicon carbide, the better the physical properties of the material as regards processing into heat-shrinkable articles. The silicon carbide may be substantially pure or may contain impurities, such as aluminium, boron, titanium and/or zirconium, which modify its electrical conductivity.

As the conducting particulate filler, there may be used, for example, carbon black and/or a finely divided metal, for example zinc, aluminium, chromium, copper, bronze, brass, iron, lead, silver or nickel. For practical purposes, including cost, finely divided aluminium, copper, bronze, brass or iron is preferably used as the metal. The use of carbon black has the advantages that it reinforces the polymer base and that the amount of silicon carbide necessary is reduced which results in the material having more favorable properties, for example a better expansion ratio. Finely divided metals do not reinforce the polymer base as well as carbon black does, but do permit the use of smaller amounts of silicon carbide.

The present invention also provides an article, for example a tube, which can be rendered heat-shrinkable, formed of the material specified above. Such articles may be formed by conventional methods, for example by extrusion.

The present invention also provides a heat-shrinkable article, for example a tube, of the material specified above. By the term "heat-shrinkable article", it is meant an article which retains its dimensions under low or normal temperature conditions but at least one dimension of which is reduced upon heating to a critical temperature.

The article which can be rendered heat-shrinkable can be so rendered by normal methods. Thus, the material of construction is firstly cross-linked, for example by irradiation with β- or γ-radiation, the article is then expanded by the desired amount at a temperature at or above said critical temperature while maintaining it in the expanded state. The material of construction may be cross-linked prior to processing it into an article. Of course, when the material is to be chemically cross-linked, the cross-linked agent, for example a peroxide, must be incorporated during the manufacture of the material. It has been found that the method of cross-linking has a marked effect on the amount of elongation at break of the material and, therefore, on the degree of heat-shrinkable properties that can be imparted to the material. Thus, it has been found that, for a given material, an expansion ratio (determined from the change on expansion in internal diameter of a hollow article of the material) greater than 1.8:1 cannot be obtained if cross-linking has been effected by irradiation with β- or γ-radiation; whereas, an expansion ratio of up to 3.0:1 can be obtained if cross-linking has been effected chemically using a peroxide.

The material of the invention may contain additional ingredients, for example other fillers, stabilizers, anti-oxidants, lubricants or cure systems, for example polyunsaturated monomers or peroxides.

The heat-shrinkable articles of the invention may be heat-shrunk onto, for example, cable terminations to provide stress control coverings thereon. It will be appreciated, however, that they have applications to electrical parts other than cable terminations where it is desirable to have stress control coverings, for example, to lighting arrestors, switch components of ends of stator bars.

According to a modification of the invention, there is provided an article, which can be rendered heat-shrinkable, which article comprises a laminate of a layer of an elastomer having dispersed therein silicon carbide and, optionally, a particulate filler, and a layer of a polymeric material, which polymeric material can be rendered heat-shrinkable.

As the elastomer, there may be used, for example one of the rubbers mentioned above, a fluoroelastomer, a chlorinated or chlorosulphonated polyethylene, a polyurethane, an acrylate, a silicone or a fluorosilicone.

There is also provided a heat-shrinkable article illustrated in FIG. 1, comprising a laminate 20 of a layer 21 of an elastomer having dispersed therein silicon carbide and a layer 22 of a heat-shrinkable polymeric material.

The grade of the silicon carbide is preferably the same as that mentioned above, but coarser grades, for example grades as coarse as 300 grit size, may be used.

The elastomer layer may be inside or outside the layer 21 of polymeric material as illustrated with reference to a heat-shrinkable tube member 23 in FIGS. 1A and 1B respectively. It is preferable, however, for the elastomer layer 21 to be on the inside as in FIG. 1A so that an insulating layer of polymeric material is on top, whereby better stress grading on, for example, cable terminations is obtained since at high stress points all of the conducting particles are coated with the insulating layer of polymeric material and sharp grains of silicon carbide cannot initiate discharges.

Heat-shrinkable articles according to the modification of the invention may be obtained in the normal manner, for example as described above, and have similar applications to the article described earlier in this specification.

The laminar articles of the modification of the invention have two main advantages over the articles described earlier, namely that they can have higher expansion ratios (determined from the change in internal diameter of the article on expansion), for example up to 5 or 6 to 1 and, depending on the elastomer, excellent oil resistance.

In the modification of the invention, it is also possible for the article to comprise a laminate of a layer of material comprising the above mentioned blend of polymers having dispersed therein silicon carbide and a layer of a polymeric material, but in such cases the expansion ratios would be limited.

The present invention also provides an electrical member, for example an electric cable, which has had shrunk thereabout a heat-shrinkable article of the invention.

The following examples illustrate embodiments of the invention:

EXAMPLE 1

The following substances were mixed together in a twin roll laboratory mill at about 120°C.:

| Substance | Parts by Weight |
| --- | --- |
| Royalene 611 | 100 |
| DYNH | 40 |
| DPD 6169 | 45 |
| Agerite Resin D | 5 |
| Silicon Carbide (Grade F1200/3 ex Carborundum Co.) | 380 |
| Triallyl Cyanurate | 2.5 |
| Zinc Stearate | 1.8 |

Royalene 611 is an ethylene-propylene-ethylidene norbornene terpolymer, containing approximately 70% of ethylene, about 3.5% ENB and having a Mooney Viscosity of about 40. It is oil extended with 40 phr paraffinic oil and is supplied by Uniroyal Limited.

Silicon Carbide (Grade F1200/3) is made by the Carborundum Co. The average particle size of this material is about 3 microns.

DYNH is a low density polyethylene. MFI 3 made by Union Carbide.

The nonlinear resistance of the resulting material was measured by the following method:

In accordance with BS 2782 Pt. 201C, a plaque of the material having a thickness of 1 mm was placed between two circular brass electrodes, one on each side of the plaque, and the current flowing across the plaque was measured at different applied DC voltages using a conventional testing apparatus in a manner well known in the art. For a given material $I = KV^\gamma$ where
 $I$ = current
 $V$ = voltage
 $K$ is a constant and
 $\gamma$ is a constant (1 for a material which obeys Ohm's Law).

The current I was measured against the voltage V from 100 volts to 10 kilovolts. It was found that the material did not obey Ohm's Law; the value for gamma being 5.1.

The material was then extruded into tubing having an internal diameter of 0.490 in. and a wall thickness of 0.090 in. The tubing was irradiated with high energy electrons at 1.5 MeV, to a dose of 12.5 Mrads, after which the following properties were determined:

| Temperature | Tensile Strength | Elongation at Break | 100% Modulus |
|---|---|---|---|
| 23°C | 63 Kg.cm$^{-2}$ | 83% | — |
| 150°C | 5.8 Kg.cm$^{-2}$ | 490% | 3.4 Kg.cm$^{-2}$ |

The tubing was then expanded to an internal diameter of 0.850 in. at 150°C on a PTFE mandrel to yield heat-shrinkable tubing.

The use of a shrunk length of this tubing as a stress control covering on a high voltage cable termination will now be described with reference ot FIG. 2 of the accompanying drawings which shows a sectional side elevation of one end of a 10 kilovolt cable which has been prepared for termination.

Referring to FIG. 2 of the drawings, a 10 kilovolt polyethylene cable designated generally by reference numeral 1 comprises a central conductor 2 surrounded by a conductive polyethylene stress control layer 3; the layer 3 being surrounded by an insulating layer 4. The bulk portion of the cable 1 also comprises a carbon paper layer 5, a copper screen 6 and an outer insulating sheath 7. The terminated portion of the cable 1 comprises the central conductor 2, the conductive polyethylene stress control layer 3, the insulating layer 4 and a short length of the carbon paper layer 5 and copper screen 6 extending from the bulk portion of the cable. The end of the cable 1 is provided with a cable lug 8 attached to the central conductor 2.

A 12 cm length of the heat-shrinkable tubing was shrunk onto the terminated portion of the cable 1 with an overlap of about 2 cm onto the extended portion of the copper screen 6, to provide a stress control covering 9. The heat-shrinkable tubing was also shrunk onto whipping 10 and an earth tail 11 within the region of overlap onto the copper screen 6. No attempt was made to fill the air gap between the covering 9 and the extended portion of the copper screen 6.

Discharge magnitude of a 2 m length of the above 10 kilovolt cable, each end of which had been terminated as described above were determined using the apparatus and circuit shown in FIG. 3 of the accompanying drawings.

Referring to FIG. 3 of the drawings, an earthed or grounded wire screen cage 12 contains a discharge-free step-up transformer 13, the secondary windings of which are connected to the central conductor 2 and the screen 6 respectively of the cable 1, through ground, via a parallel-connected voltage dropper 14 and blocking capacitor 15. The primary windings of the transformer 13 are connected to an AC input via a control and filter unit 16. Discharge levels in the cable and end terminations were measured using an ERA Mark III discharge detector 17 connected as shown.

The following results were obtained:

| Discharge Magnitude in pC | Applied Voltage KV r.m.s. |
|---|---|
| 1 | 16.2 |
| 5 | 24.3 |

For comparison, the same cable was tested without the heat-shrunk tubing or other means of stress control and the result was a discharge magnitude of 5pC at an applied voltage of 4 KV r.m.s. Thus, it can be seen that the covering of the material of the invention affords excellent stress control and that the cable terminations are substantially discharge free at the normal working voltage of 5.8 KV (phase to ground).

EXAMPLE 2

The following substances were mixed together as described in Example 1:

| Substance | Parts by Weight |
|---|---|
| Royalene 512 | 150 |
| DPD 6169 | 67 |
| DYNH | 60 |
| Agerite Resin D | 7.5 |
| Aerosil 200 | 30 |
| Silane A151 | 11.4 |
| SiC as in Example 1 | 570 |
| Zinc Stearate | 10 |
| Triallyl Cyanurate | 3 |
| 2,5-di-methyl-2,5-di-t-butyl-peroxy-hexyne-3 | 2 |

The nonlinear resistance behaviour of the material was determined as described in Example 1. The value of $\gamma$ over the voltage range of 100 V to 10 KV was found to be 5.3.

The resulting material was pressed into test plaques of dimensions 5 in. × 5 in. × 0.075 in. at 190°C. for 12 minutes and the following physical properties were determined:

| Temperature | Tensile Strength | Elongation at Break | 100% Modulus |
|---|---|---|---|
| 23°C | 64 Kg.cm$^{-2}$ | 193% | — |
| 150°C | 22 Kg.cm$^{-2}$ | 269% | 14.4 Kg.cm$^{-2}$ |

Raychem cones (part no. 200 W 057 comprising a moulded tube 9½ in. in length the wall thickness of which uniformly tapers from 0.25 in. at one end to 0.02 in. at the other end) were prepared from the material by curing in a press at 200°C for 12 minutes. These cones were expanded to an internal diameter of 1.30 ins. by heating them to 150°C. and pushing them over a PTFE mandrel. Two of these cones were heat-shrunk onto the ends of a 20 KV cable (i.e., a cable having a working voltage of 11.6 KV phase to ground) terminated as described in Example 1; again no precautions being taken to fill the air gap. The internal diameter of the shrunk parts was 0.75 in. The discharge magnitudes were determined as described in Example 1 and the following results were obtained:

| Discharge Magnitude in pC | Applied Voltage KV r.m.s. |
|---|---|
| 1 | 30 |
| 5 | 50 |
| Control (no stress control layer) 5 | 4.6 |

Thus, it can be seen that the terminations are substantially discharge free at an applied voltage level of more than 2.5 times the working voltage of the cable and that the level for a discharge magnitude of 5pC, which is normally regarded as acceptable, is nearly 5 times the working voltage.

Example 3

To show the effect of varying ethylene content of the rubber on the physical properties of the material of the invention.

The following substances were mixed together as described in Example 1.

| Substance | Parts by Weight |
|---|---|
| EPDM Rubber (see below) | 100 |
| DYNH | 40 |
| DPD 6169 | 45 |
| Agerite Resin D | 5 |
| Zinc Stearate | 1.8 |
| Silicon Carbide as in Example 1 | 380 |
| Triallyl Cyanurate | 2.5 |

Six different materials (A to F) were prepared, having different EPDM contents as follows:

| Material | Parts by Weight and Nature of EPDM Rubber | |
|---|---|---|
| A | 100 pts Royalene 611 | |
| B | 67 pts Royalene 611 | 33 pts Royalene 301T |
| C | 33 pts Royalene 611 | 67 pts Royalene 301T |
| D | 20 pts Royalene 611 | 80 pts Royalene 301T |
| E | 10 pts Royalene 611 | 90 pts Royalene 301T |
| F | | 100 pts Royalene 301T |

Each material was extruded into tubing of 0.125 in. internal diameter and having a wall thickness of 0.025 in. The tubing was irradiated with γ-rays from a $Co^{60}$ source at 1.25 MeV to a dose of 12.5 Mrads after which the following properties were determined:

| Material | Tensile Strength | Elongation at Break (23°C) |
|---|---|---|
| A | 63 Kg.cm$^{-2}$ | 83% |
| B | 54 Kg.cm$^{-2}$ | 73% |
| C | 51 Kg.cm$^{-2}$ | 62% |
| D | 54 Kg.cm$^{-2}$ | 33% |
| E | 51 Kg.cm$^{-2}$ | 33% |
| F | 63 Kg.cm$^{-2}$ | 33% |

EXAMPLE 4

Use of a combination of SiC and Conducting Carbon Black.

The following substances were mixed together as described in Example 1:

| | Material A | Material B | Material C |
|---|---|---|---|
| Royalene 611 | 100 | 100 | 100 |
| DYNH | 40 | 40 | 40 |
| DPD 6169 | 45 | 45 | 45 |
| Agerite Resin D | 5 | 5 | 5 |
| Emulsifiable Polyethylene | 5 | 5 | 5 |
| Vulcan 3 | — | — | 8.25 |
| Vulcan XXX Sp. | — | 27.5 | 30 |
| Silicon Carbide as in Example 1 | 380 | 260 | 200 |
| Triallyl Cyanurate | 2.5 | 2.5 | 2.5 |
| 2,5-di-methyl-2,5-di-t-butyl-peroxy-hexyne-3 | 5 | 5 | 5 |

Plaques 1 mm. thick were moulded from each of the three materials and the electrical resistance characteristics determined as described in Example 1.

None of the materials obeyed Ohm's Law, the values of γ being:

| Material A | 5.0 |
|---|---|
| Material B | 4.3 |
| Material C | 4.4 |

The current passed by the plaques at a voltage stress of 1KV/mm was:

| Material A | 0.01 μA |
|---|---|
| Material B | 0.08 μA |
| Material C | 0.17 μA |

Thus, even on substantially reducing the amount of the nonlinear filler, no marked deterioration in electrical properties occurs.

Similar plaques 1 mm thick were moulded from each material and the physical properties determined at 23° and 150°C.

| | At Room Temperature | | At 150°C | | |
|---|---|---|---|---|---|
| Material | Tensile Strength Kg.cm$^{-2}$ | Elongation at Break % | Tensile Strength Kg.cm$^{-2}$ | Elongation at Break % | 100% Modulus Kg.cm$^{-2}$ |
| A | 72.75 | 177 | 9.82 | 428 | 5.33 |
| B | 70.52 | 318 | 15.06 | 324 | 8.25 |
| C | 100.85 | 480 | 18.84 | 483 | 6.81 |

Two Raychem Part RUK 453-3 (a tube 100 mm long with a 3 mm wall thickness and an internal diameter of 20 mm) were moulded from Material C. These were mechanically expanded on a PTFE mandrel to an internal diameter of 40 mm. One of these tubes was shrunk on each end of a 2 m. length of Polyethylene insulated 11.6/20 KV cable, prepared for termination as described in Example 1, in such a manner that each tube overlapped the conducting screen by 20 mm.

The cable was connected to the H/V output of a 50 KV Discharge Free transformer. The discharge inception levels were measured as described in Example 1 and were found to be as follows:

| Discharge Magnitude (pC) | Applied Voltage (KV r.m.s.) |
|---|---|
| 1 | 26 |
| 5 | 29 |

For comparison, the same length of cable with no form of stress control gave a discharge level of 5pC at 4.8 KV r.m.s. applied voltage.

From the foregoing results, it will be substantially seen that this material gives good stress relief; the cable being substantially discharge free at the working voltage (11.6 KV phase to ground). Further, a marked improvement in physical properties compared to articles of a material not containing a conducting particulate filler is evident.

EXAMPLES 5 TO 10

These Examples show the use of conducting particulate materials, i.e., metal powders in conjunction with silicon carbide.

| Substance | Example Nos. | | | | | |
|---|---|---|---|---|---|---|
| | 5 | 6 | 7 | 8 | 9 | 10 |
| Royalene 611 | 60 | 60 | 60 | 60 | 60 | 60 |
| DYNH | 16 | 16 | 16 | 16 | 16 | 16 |
| DPD 6169 | 24 | 24 | 24 | 24 | 24 | 24 |
| Agerite Resin D | 4 | 4 | 4 | 4 | 4 | 4 |

-continued

| Substance | Example Nos. | | | | | |
|---|---|---|---|---|---|---|
| | 5 | 6 | 7 | 8 | 9 | 10 |
| Silicon Carbide (Grade F1200/3) | 300 | 225 | 200 | 200 | 200 | 200 |
| Copper Powder | — | — | 50 | 100 | — | — |
| Aluminium Dust | — | 75 | — | — | — | — |
| Iron Powder | — | — | — | — | 50 | 100 |
| Zinc Stearate | 4 | 4 | 4 | 4 | 4 | 4 |
| Triallyl Cyanurate | 1.4 | 1.4 | 1.4 | 1.4 | 1.4 | 1.4 |
| 2,5-di-methyl-2,5-di-t-butyl-peroxy-hexyne-3 | 1.5 | 1.5 | 1.5 | 1.5 | 1.5 | 1.5 |

The above substances were processed as described in Example 1. The $\gamma$ coefficient was measured for each material by the method described in Example 1. The values obtained were as follows:

Material of:

| Example 1 | $\gamma_1 = 2.7$ ; $\gamma_2 = 4.0$ |
| Example 2 | 5.71 |
| Example 3 | $\gamma_1 = 5.0$ ; $\gamma_2 = 3.8$ |
| Example 4 | $\gamma_1 = 5.2$ ; $\gamma_2 = 3.7$ |
| Example 5 | 4.3 |
| Example 6 | 7.5 |

Where different slopes of the current versus stress curve were obtained for a given material, these are given as $\gamma_1$ and $\gamma_2$.

The aluminium dust was Grade 300 dust from Alcan Ltd.

The iron and copper powders were finer than 300 mesh (B.S.) and were obtained from Hopkin and Williams Ltd.

Figure 5:
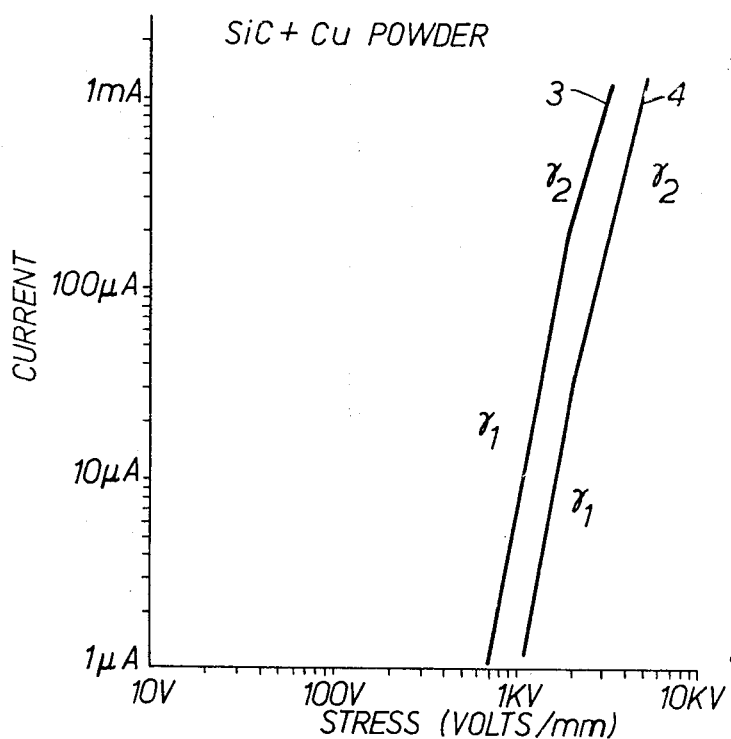
Figure 6:
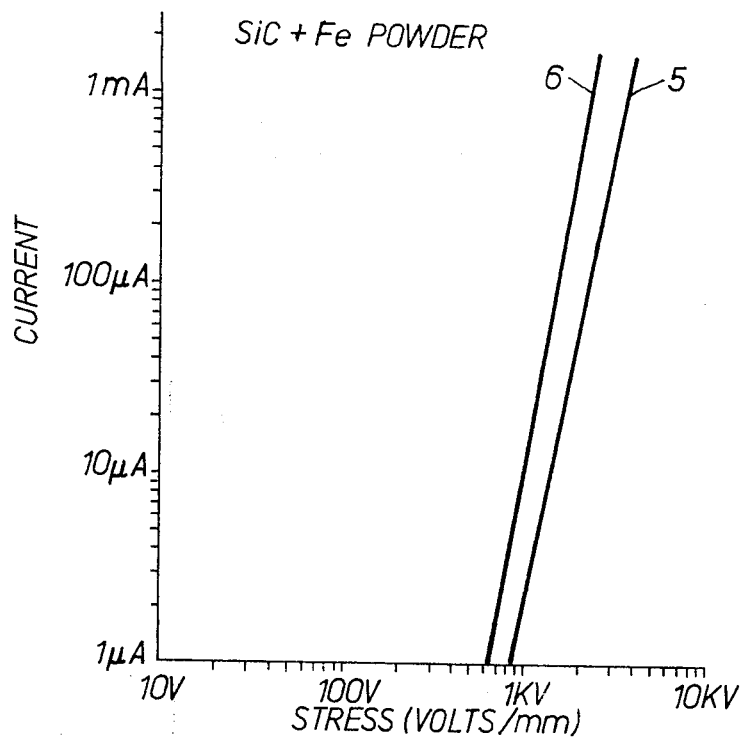

The current-voltage stress plots are shown in FIGS. 4 to 6 of the accompanying drawings.

The physical properties of the materials of Examples 5 and 6 were as follows:

| Example Nos. | | 5 | 6 |
|---|---|---|---|
| 23°C | Tensile Strength Kg.cm$^{-2}$ | 52.4 | 35.2 |
| | % Elongation at Break | 20 | 90 |
| 150°C | Tensile Strength Kg.cm$^{-2}$ | 7.02 | 5.1 |
| | % Elongation at Break | 80 | 147 |
| | 100% Modulus | — | 5.1 |

Thus, the physical properties of the material of Example 6, containing the aluminium dust, are much better than those of Example 5 in respect of elongation at break. This difference is particularly significant at elevated temperatures.

EXAMPLE 11

This Example shows the use of a nitrile rubber.

| Substance | 7 |
|---|---|
| Breon 1041 | 100 |
| DYNH | 50 |
| Agerite Resin D | 5 |
| Silicon Carbide (Grade F1200/3) | 300 |
| Triallyl Cyanurate | 3 |
| 2,5-di-methyl-2,5-di-t-butyl-peroxy-hexyne-3 | 5 |
| zinc stearate | 3 |

The above substances were processed by compounding on a twin roll laboratory mill and then pressed into plaques 6 × 6 × 0.040 ins. at 190°C for 10 mins. The physical properties of the resulting material were as follows:

| | 23°C | 150°C |
|---|---|---|
| Tensile Strength Kg.cm$^{-2}$ | 49 | 16 |
| % Elongation at Break | 244 | 104 |
| 100% Modulus | — | 15 |

Figure 7:
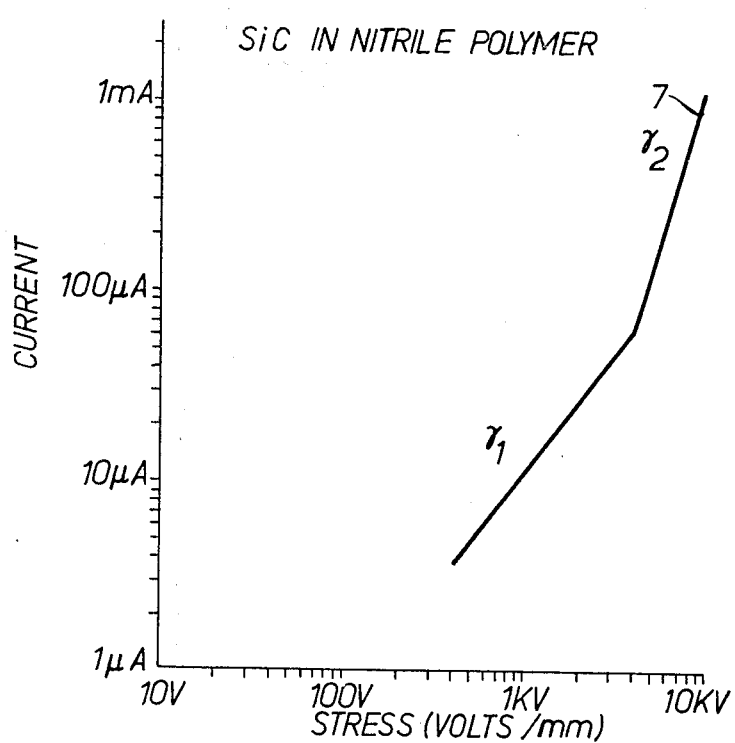

The electrical properties were measured as described in Example 1 and the current-voltage stress plot revealed two $\gamma$ coefficients, $\gamma_1 = 1.25$ $\gamma_2 = 3.54$, as shown in FIG. 7 of the accompanying drawings.

While embodiments and applications of this invention have been shown and described, it will be apparent to those skilled in the art that many more modifications are possible without departing from the inventive concepts herein described. The invention, therefore, is not to be restricted, except as is necessary by the prior art and the spirit of the appended claims.

What is claimed as new and desired to be secured by Letters Patent of the United States is:

1. A heat-shrinkable article possessing nonlinear electrical resistance characteristics comprising a laminate of:
    a first layer of an elastomer having dispersed therein particulate silicon carbide; and
    a second layer of a heat-shrinkable polymeric material.

2. The article of claim 1 wherein said first and second layer form a tube member.

3. The article of claim 2 wherein said first layer is formed on the inside of the tube member.

4. The article of claim 1 further including a particulate filler dispersed in said first layer.

5. The article of claim 1 wherein said particulate silicon carbide is about 300 grit size or finer.

6. The article of claim 1 wherein the elastomer is chosen from the group consisting of a fluoroelastomer, a chlorinated polyethylene, a chlorosulphonated polyethylene, a polyurethane, an acrylate, a silicone and a fluorosilicone.

7. The article of claim 1, wherein the elastomer is chosen from the group consisting of an ethylene-propylene rubber copolymer wherein the ethylene content is at least about 65%, an ethylene-non-conjugated diene rubber terpolymer wherein the ethylene content is at least about 65% and a butadiene/acrylonitrile rubber containing about 10% to about 40% by weight acrylonitrile.

8. The article of claim 7, wherein when said elastomer is selected from the group consisting of the copolymer and the terpolymer, the ethylene content thereof being at least about 70%.

9. The article of claim 11, wherein said particulate silicon carbide is about 300 grit size or finer.

10. An article capable of being rendered heat-shrinkable and possessing non-linear electrical resistance characteristics comprising of a laminate of:
    a first layer of an elastomer having dispersed therein particulate silicon carbide; and
    a second layer of polymeric material capable of being rendered heat-shrinkable.

11. The article of claim 10, wherein said first and second layer form a tube member.

12. The article of claim 11, wherein said first layer is formed on the inside of the tube member.

13. The article of claim 10, further including a particulate filler dispersed in said first layer.

14. The article of claim 10, wherein said particulate silicon carbide is about 300 grit size or finer.

15. The article of claim 10, wherein the elastomer is chosen from the group consisting of a fluoroelastomer, a chlorinated polyethylene, a chlorosulphonated polyethylene, a polyurethane, an acrylate, a silicone and a fluorosilicone.

* * * * *

UNITED STATES PATENT AND TRADEMARK OFFICE
CERTIFICATE OF CORRECTION

PATENT NO. : 3,950,604
DATED : April 13, 1976
INVENTOR(S) : RICHARD J. PENNECK

It is certified that error appears in the above-identified patent and that said Letters Patent are hereby corrected as shown below:

In column 12, line 56, the claim reference numeral "11" should read -- 7 --.

Signed and Sealed this

Fifth Day of October 1976

[SEAL]

*Attest:*

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,950,604

DATED : April 13, 1976

INVENTOR(S) : RICHARD J. PENNECK

It is certified that error appears in the above-identified patent and that said Letters Patent are hereby corrected as shown below:

In column 6, line 53, the formula should read -- $I = KV^Y$ --.

Signed and Sealed this

Ninth Day of December 1980

[SEAL]

Attest:

SIDNEY A. DIAMOND

*Attesting Officer*  *Commissioner of Patents and Trademarks*